US012658606B2

(12) United States Patent
Lee et al.

(10) Patent No.: US 12,658,606 B2
(45) Date of Patent: Jun. 16, 2026

(54) ELECTRONIC DEVICE FOR PERFORMING BEAM SWITCHING AND/OR BEAMFORMING AND OPERATING METHOD THEREOF

(71) Applicants: Samsung Electronics Co., Ltd., Suwon-si (KR); WiseJet Inc., Daejeon (KR)

(72) Inventors: Jaesup Lee, Yongin-si (KR); Byeong Nam Ahn, Yongin-si (KR); Hyeong Beom Ju, Daejeon (KR)

(73) Assignees: Samsung Electronics Co., Ltd., Suwon-si (KR); WiseJet Inc., Daejeon (KR)

( * ) Notice: Subject to any disclaimer, the term of this patent is extended or adjusted under 35 U.S.C. 154(b) by 208 days.

(21) Appl. No.: 17/887,676

(22) Filed: Aug. 15, 2022

(65) Prior Publication Data

US 2023/0123914 A1 Apr. 20, 2023

(30) Foreign Application Priority Data

Oct. 18, 2021 (KR) ........................ 10-2021-0138272

(51) Int. Cl.

*H01Q 25/00* (2006.01)
*H01Q 1/24* (2006.01)
(Continued)

(52) U.S. Cl.

CPC ........... *H01Q 25/002* (2013.01); *H01Q 1/241* (2013.01); *H01Q 19/30* (2013.01); *H01Q 21/065* (2013.01); *H01Q 25/005* (2013.01)

(58) Field of Classification Search

CPC ...... H01Q 25/005; H01Q 21/065; H01Q 3/24; H01Q 25/002; H01Q 1/241; H01Q 19/30; H04B 7/0617

See application file for complete search history.

(56) References Cited

U.S. PATENT DOCUMENTS

| | | | |
|---|---|---|---|
| 10,205,235 | B2 | 2/2019 | Athley et al. |
| 10,727,917 | B2 | 7/2020 | Athley et al. |

(Continued)

FOREIGN PATENT DOCUMENTS

| | | | |
|---|---|---|---|
| KR | 10-2015-0100653 | A | 9/2015 |
| KR | 10-1839522 | B1 | 3/2018 |

(Continued)

OTHER PUBLICATIONS

Mehrnia, Niloofar, et al., "Power Efficient Beam-Forming Algorithm for Ultra-Reliable Low Latency Millimeter-Wave Communications," *2019 IEEE International Black Sea Conference on Communications and Networking* (*BlackSeaCom 2019*), conference held Jun. 3-6, 2019, Sochi, Russia, paper presented on Jun. 6, 2019, added to IEEE Xplore on Aug. 26, 2019, pp. 1-5, doi: 10.1109/BlackSeaCom.2019.8812783.

(Continued)

*Primary Examiner* — Aristocratis Fotakis

(74) *Attorney, Agent, or Firm* — NSIP Law

(57) ABSTRACT

An electronic device includes one or more antenna arrays; and a controller configured to control the one or more antenna arrays. The controller is configured to maintain a current beam formed in a first sector by the one or more antenna arrays in an on state and turn on a new beam in a second sector that is different from the first sector, and turn off either the current beam or the new beam based on whether a signal quality of the new beam is greater than a signal quality of the current beam.

17 Claims, 11 Drawing Sheets

(51) Int. Cl.

| | |
|---|---|
| ***H01Q 19/30*** | (2006.01) |
| ***H01Q 21/06*** | (2006.01) |

(56) References Cited

U.S. PATENT DOCUMENTS

| | | | | |
|---|---|---|---|---|
| 2017/0207843 | A1* | 7/2017 | Jung | H04B 7/0695 |
| 2018/0146419 | A1* | 5/2018 | Raghavan | H04W 48/16 |
| 2018/0199258 | A1* | 7/2018 | Cezanne | H04B 7/0695 |
| 2018/0324657 | A1* | 11/2018 | Li | H04B 7/0691 |
| 2018/0351618 | A1* | 12/2018 | Ho | H04B 7/0695 |
| 2019/0044578 | A1* | 2/2019 | Rao | H04B 7/043 |
| 2019/0319686 | A1 | 10/2019 | Chen, IV et al. | |
| 2020/0014444 | A1 | 1/2020 | Mueck et al. | |
| 2020/0037304 | A1* | 1/2020 | Khojastepour | H04W 4/029 |
| 2020/0145087 | A1 | 5/2020 | Li et al. | |
| 2020/0182964 | A1* | 6/2020 | Di Nallo | G01S 13/0209 |
| 2020/0395683 | A1* | 12/2020 | Cao | H04B 7/06952 |
| 2022/0232546 | A1* | 7/2022 | Hakola | H04W 24/08 |
| 2022/0271810 | A1* | 8/2022 | Loghin | H04B 7/0695 |
| 2022/0376768 | A1* | 11/2022 | Harrebek | H04B 7/088 |
| 2023/0106678 | A1* | 4/2023 | Zhou | H04W 24/08 370/329 |
| 2023/0209365 | A1* | 6/2023 | Fouad | H04L 5/005 370/329 |
| 2024/0292232 | A1* | 8/2024 | Lee | H04W 76/19 |
| 2025/0254567 | A1* | 8/2025 | Knudsen | H04W 24/08 |

FOREIGN PATENT DOCUMENTS

| | | | |
|---|---|---|---|
| KR | 10-2018-0045388 | A | 5/2018 |
| KR | 10-2022082 | B1 | 9/2019 |
| KR | 10-2029102 | B1 | 11/2019 |
| KR | 10-2020-0052611 | A | 5/2020 |
| KR | 10-2116410 | B1 | 5/2020 |
| KR | 10-2233939 | B1 | 3/2021 |

OTHER PUBLICATIONS

Joshi, Kishor Chandra, et al., "Analyzing the Trade-offs in Using Millimeter Wave Directional Links for High Data Rate Tactile Internet Applications," *IEEE Transactions on Industrial Informatics*, vol. 16, Issue 3, Mar. 2020, pp. 1924-1932, arXiv:1909.03902v1, Sep. 9, 2019, pp. 1-8.

Na, Woongsoo, et al., "Simulation and measurement: Feasibility study of Tactile Internet applications for mmWave virtual reality," *ETRI Journal*, vol. 42, Issue 2, Apr. 2020, pp. 163-174, first published Jan. 10, 2020.

* cited by examiner

ELECTRONIC DEVICE FOR PERFORMING BEAM SWITCHING AND/OR BEAMFORMING AND OPERATING METHOD THEREOF

CROSS-REFERENCE TO RELATED APPLICATIONS

This application claims the benefit under 35 USC 119(a) of Korean Patent Application No. 10-2021-0138272 filed on Oct. 18, 2021, in the Korean Intellectual Property Office, the entire disclosure of which is incorporated herein by reference for all purposes.

BACKGROUND

1. Field

The following description relates to an electronic device for performing beam switching and/or beamforming and an operating method of the electronic device.

2. Description of Related Art

Beamforming refers to a method of transmitting directional signals using an antenna array including a plurality of antennas. Such beamforming may be used when a high path loss needs to be overcome in a millimeter wave communication.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes one or more antenna arrays; and a controller configured to control the one or more antenna arrays, wherein the controller is configured to maintain a current beam formed in a first sector by the one or more antenna arrays in an on state; turn on a new beam in a second sector that is different from the first sector; and turn off either the current beam or the new beam based on whether a signal quality of the new beam is greater than a signal quality of the current beam.

The controller may be further configured to turn off the current beam in response to the signal quality of the new beam being greater than the signal quality of the current beam; and perform communication through the new beam.

The controller may be further configured to turn off the new beam in response to the signal quality of the new beam not being greater than the signal quality of the current beam; turn on a second new beam in a third sector that is different from the second sector; and turn off either the current beam or the second new beam based on whether a signal quality of the second new beam is greater than the signal quality of the current beam.

The controller may be further configured to form a wide beam by increasing a width of the current beam by the one or more antenna arrays; adjust the wide beam in a direction in which a signal quality of the adjusted wide beam is greater than the signal quality of the current beam; and reduce a width of the adjusted wide beam to an original width of the current beam that was widened to form the wide beam.

The controller may be further configured to maintain the current beam formed in the first sector in the on state in response to there being no direction in which the signal quality of the adjusted wide beam is greater than the signal quality of the current beam; turn on another new beam in the second sector; and turn off either the current beam or the other new beam based on whether a signal quality of the new beam is greater than the signal quality of the current beam.

The electronic device may be a fixed electronic device, and the controller may be further configured to operate the fixed electronic device as a receiver, maintain the current beam formed in the first sector in the on state, turn on the new beam in the second sector, and turn off either the current beam or the new beam based on whether the signal quality of the new beam is greater than the signal quality of the current beam in response to it being impossible to adjust another wide beam in a direction in which a signal quality of the adjusted other wide beam is greater than a signal quality of another current beam in a mobile electronic device operating as a transmitter.

The controller may be further configured to operate the electronic device as a receiver; maintain the current beam formed in a first sector in the on state, turn on the new beam in the second sector, and turn off either the current beam or the new beam in response to the electronic device operating as the receiver; operate the electronic device as a transmitter in response to the signal quality of the new beam not being greater than the signal quality of the current beam; maintain a second current beam formed in the first sector by the one or more antenna arrays; turn on a third new beam in the second sector; and turn off either the second current beam or the third new beam based on whether the signal quality of the third new beam is greater than the signal quality of the second current beam.

The first sector and the second sector may correspond to different sides of the electronic device.

The electronic device may further include either one or both of a camera configured to capture an image of a front of the electronic device and/or surroundings of the electronic device; and an inertial measurement unit (IMU) configured to measure a movement of the electronic device, wherein the controller is further configured to select the second sector from a plurality of sectors that are different from the first sector based on a movement of the electronic device estimated from the image captured by the camera and/or the movement of the electronic device measured by the IMU.

In another general aspect, an electronic device includes one or more antenna arrays; and a controller configured to control the one or more antenna arrays, wherein the controller is configured to form a wide beam by increasing a width of a current beam by the one or more antenna arrays; adjust the wide beam in a direction in which a signal quality of the adjusted wide beam is greater than a signal quality of the current beam; and reduce a width of the adjusted wide beam to an original width of the current beam that was widened to form the wide beam.

The controller may be further configured to adjust the wide beam in a direction in which the signal quality of the adjusted wide beam is greater than the signal quality of the current beam in a same sector as the current beam.

The controller may be further configured to operate the electronic device as a transmitter; form the wide beam, adjust the wide beam, and reduce the width of the adjusted wide beam in response to the electronic device operating as the transmitter; operate the electronic device as a receiver in response to it being impossible to adjust the wide beam in a direction in which the signal quality of the adjusted wide beam is greater than the signal quality of the current beam; form a second wide beam by increasing a width of a third current beam by the one or more antenna arrays; adjust the second wide beam in a direction in which the signal quality of the adjusted second wide beam is greater than a signal quality of the third current beam; and reduce a width of the adjusted second wide beam to an original width of the third current beam that was widened to form the second wide beam.

The current beam may be formed in a first sector by the one or more antenna rays, and the controller may be further configured to maintain the current beam formed in the first sector in an on state; turn on a new beam in a second sector that is different from the first sector; and turn off either the current beam or the new beam based on whether a signal quality of the new beam is greater than the signal quality of the current beam.

The controller may be further configured to maintain the current beam formed in the first sector in the on state, turn on the new beam in the second sector, and turn off either the current beam or the new beam based on whether the signal quality of the new beam is greater than the signal quality of the current beam in response to there being no direction in which the signal quality of the adjusted wide beam is greater than the signal quality of the current beam.

The electronic device may further include either one or both of a camera configured to capture an image of a front of the electronic device and/or surroundings of the electronic device; and an inertial measurement unit (IMU) configured to measure a movement of the electronic device, and the controller may be further configured to determine a direction in which the signal quality of the adjusted wide beam is greater than the signal quality of the current beam based on a movement of the electronic device estimated from the image captured by the camera and/or the movement of the electronic device measured by the IMU.

In another general aspect, a method of operating an electronic device including one or more antenna arrays includes maintaining a current beam formed in a first sector by the one or more antenna arrays in an on state; turning on a new beam in a second sector that is different from the first sector; and turning off either the current beam or the new beam based on whether a signal quality of the new beam is greater than a signal quality of the current beam.

The turning off of either the current beam or the new beam may include turning off the current beam in response to the signal quality of the new beam being greater than the signal quality of the current beam, and the method may further include performing communication through the new beam.

The turning off of either the current beam or the new beam may include turning off the new beam in response to the signal quality of the new beam not being greater than the signal quality of the current beam, and the method may further include turning on a second new beam in a third sector that is different from the second sector, and turning off either the current beam or the second new beam based on whether a signal quality of the second new beam is greater than the signal quality of the current beam.

In another general aspect, a non-transitory computer-readable storage medium stores instructions that, when executed by a processor, cause the processor to perform the method described above.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
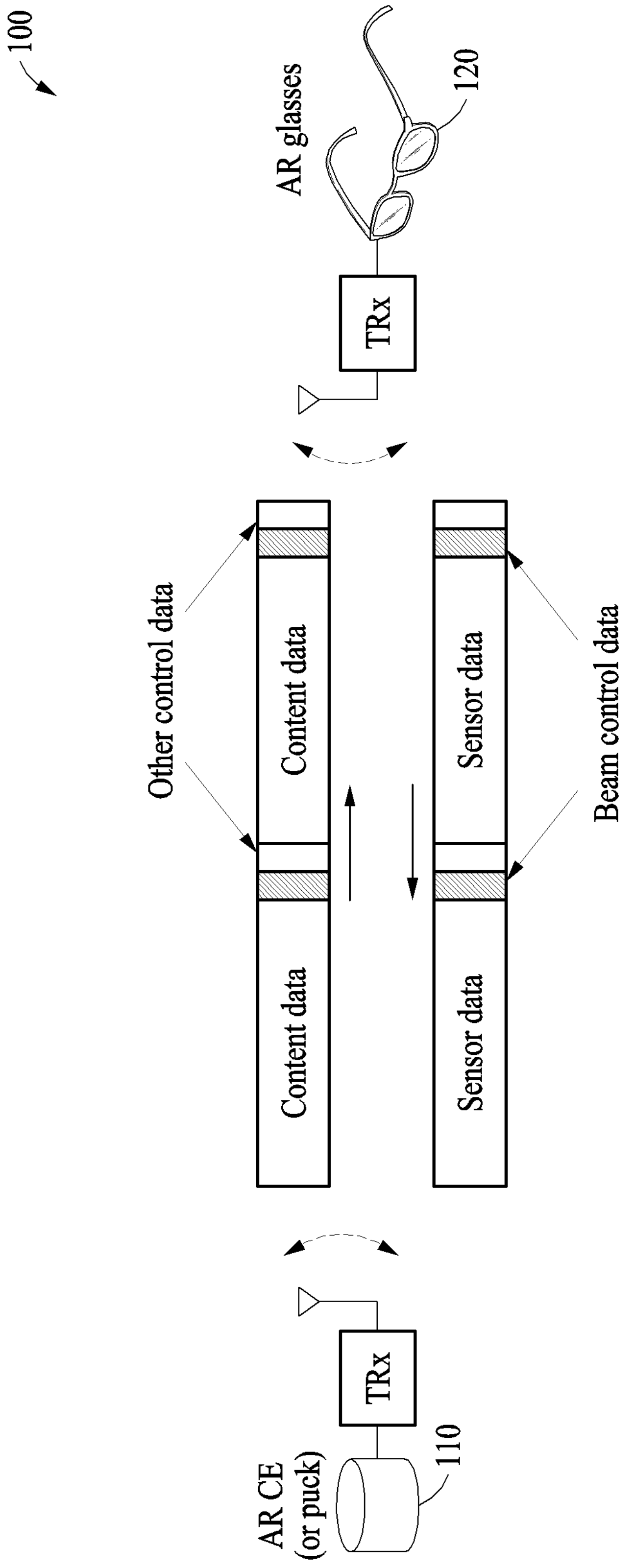
FIGS. 1 through 5 illustrate an example of a communication system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the word "may" in describing the various examples, e.g., as to what an example may include or implement, means that at least one example exists in which such a feature is included or implemented, but not all examples are limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure of this application. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which the disclosure of this application pertains based on an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

The features of the examples described herein may be combined in various ways as will be apparent after an understanding of the disclosure of this application. Furthermore, although the examples described herein have a variety of configurations, other configurations are possible as will be apparent after an understanding of the disclosure of this application.

FIGS. 1 through 5 illustrate an example of a communication system.

Referring to FIG. 1, a communication system 100 may include an augmented reality (AR) customer edge (CE) 110 and AR glasses 120. For the convenience of description, the AR CE 110 is illustrated in FIG. 1 as an example of a device for transmitting content data to the AR glasses 120, but the device for transmitting content data is not limited thereto, and an AR puck may also be applied without limitation. The AR puck may be a puck-shaped device for transmitting content data to the AR glasses 120. In addition, the AR glasses 120 are illustrated as an example of a device for reproducing content data, but the device for reproducing content data is not limited thereto.

Content data (e.g., image data, etc.) may be mainly transmitted through a downlink from the AR CE 110 to the AR glasses 120, and sensor data (e.g., an image captured by a camera, inertial measurement unit (IMU) data, etc.) may be mainly transmitted through an uplink from the AR glasses 120 to the AR CE 110. When the user is wearing the AR glasses 120, the AR glasses 120 may provide AR content provided by the AR CE 110 to a user and transmit sensed data to the AR CE 110. The data transmitted between the AR CE 110 and the AR glasses 120 may include beam control data associated with state monitoring, searching, and controlling, and other control data associated with image control and transmission/reception control. The beam control data may include control data for identifying an optimal beam and control data for setting an optimal beam in response to data that periodically provides channel state information and a degradation of a channel state.

When such control data is transmitted together through the same communication channel as content data and sensor data, the content data and the sensor data may be lost. When signal quality is low in an environment, beam control data may be frequently generated, and thus content data and sensor data may be lost in both an uplink and a downlink transmission.

To be described hereinafter, beam switching or beamforming may correspond to a technology for identifying an optimal beam between a transmitter and a receiver such that a high signal quality may be provided even in a weak communication environment in which a communication signal is weakened or a communication interface is present. For example, a transmission and reception beam direction may be switched whenever a user wearing AR glasses 120 moves. Through beam switching and/or beamforming, the transmitter may form a transmission beam in a direction of the receiver, and the receiver may form a reception beam in a direction of the transmitter. In another example, when content data is transmitted from the AR CE 110 to the AR glasses 120, the AR CE 110 may be a transmitter, and the AR glasses 120 may be a receiver. In contrast, when sensor data is transmitted from the AR glasses 120 to the AR CE 110, the AR CE 110 may be a receiver, and the AR glasses 120 may be a transmitter.

To select an optimal beam, beam switching and/or beamforming may be performed based on a beam usage environment, but a signal loss may occur when a beam is changed using beam switching and/or beamforming. Thus, when the beam is changed by the beam switching and/or the beamforming, a signal loss may need to be prevented because a loss of content data may cause reproduction quality degradation. In addition, when the beam is changed, less power consumption may be desirable because the AR glasses 120 and the AR puck are battery-operated devices.

The AR CE 110 and the AR glasses 120 illustrated in FIG. 1 may be referred to as electronic devices for performing beam-based wireless communication and beam switching and beamforming operations, which is to be described later with reference to the drawings, and any electronic device for performing basic wireless communication may be used without limitation.

Figure 2:
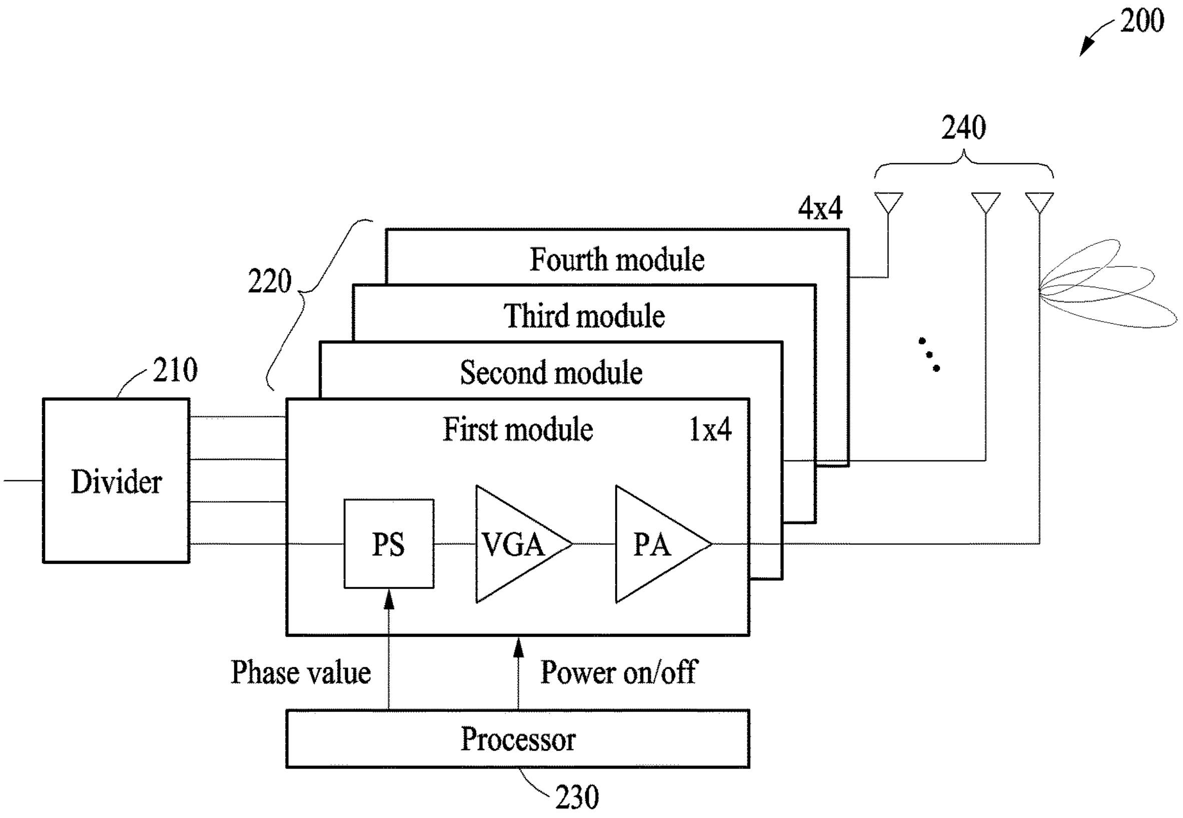

Referring to FIG. 2, an AR CE 200 may include a demultiplexer 210, modules 220, a processor 230, and antennas 240. The AR CE 200 may transmit content data to AR glasses and receive sensor data through beam switching and/or beamforming.

The divider 210 may divide and transmit data to be transmitted to the modules 220. Each of the modules 220 may process data through a phase shifter (PS), a variable gain amplifier (VGA), and a power amplifier (PA), and may be turned on or off based on a control of the processor 230. To be described hereinafter, the modules 220 may perform a beam switching or beamforming operation. For the convenience of description, four modules 220 are illustrated in FIG. 2, but the number of modules 220 is not limited thereto, and the AR CE 200 may include two or more modules.

The processor 230 may control operations of components of the AR CE 200. For example, the processor 230 may control the beam switching and/or beamforming operation by turning on some of the modules 220 and turning off other modules 220, or by controlling a phase value transmitted to the phase shifter PS.

For example, the AR CE 200 may communicate through millimeter waves (mmWave), and a transmission/reception environment may be established irrespective of the direction of the AR glasses.

Figure 3:
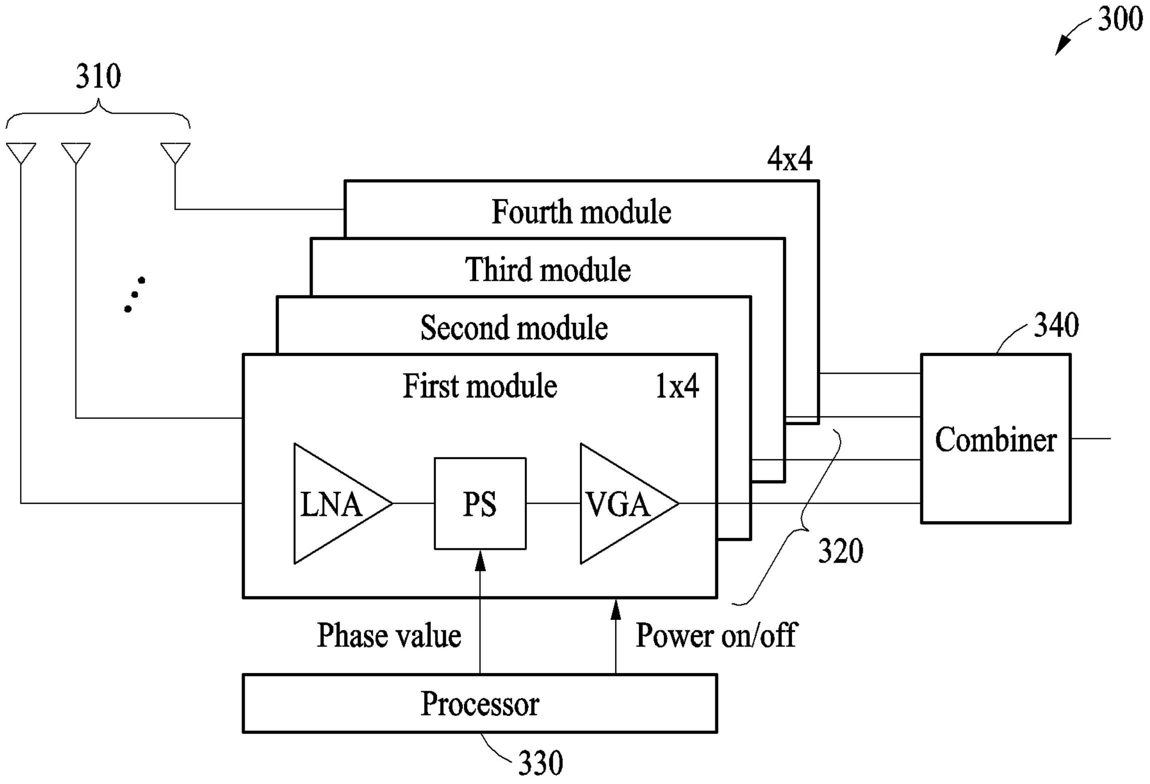

Referring to FIG. 3, AR glasses 300 may include antennas 310, modules 320, a processor 330, and a combiner 340. The AR glasses 300 may receive content data from an AR CE and transmit sensor data through beam switching and/or beamforming.

Each of the modules 320 may process data through a low noise amplifier (LNA), a phase shifter (PS), and a variable gain amplifier (VGA), and may be turned on or off based on a control of the processor 330.

The processor 330 may control an operation of components of the AR glasses 300. For example, the processor 330 may control a beam switching and/or beamforming operation by turning on some of the modules 320 and turning off other modules 320, or by controlling a phase value transmitted to the phase shifter PS.

The combiner 340 may combine and transmit data from the modules 330 to be transmitted to a controller included in the AR glasses 300 to operate components included in the AR glasses 300.

The AR CE 200 illustrated in FIG. 2 and the AR glasses 300 illustrated in FIG. 3 include the processor 230 and the processor 240, respectively, but are not limited thereto. In another example, a processor may be included in either one of the AR CE 200 and the AR glasses 300 such that the processor controls an operation of the AR CE 200 and the AR glasses 300. When the processor 230 is included in the AR CE 200 and the processor 330 is not included in the AR glasses 300, the processor 230 may control the operation of the AR glasses 300, and the controller included in the AR glasses 300 may operate the components included in the AR glasses 300 based on a determined result of the processor 230.

Figure 4:
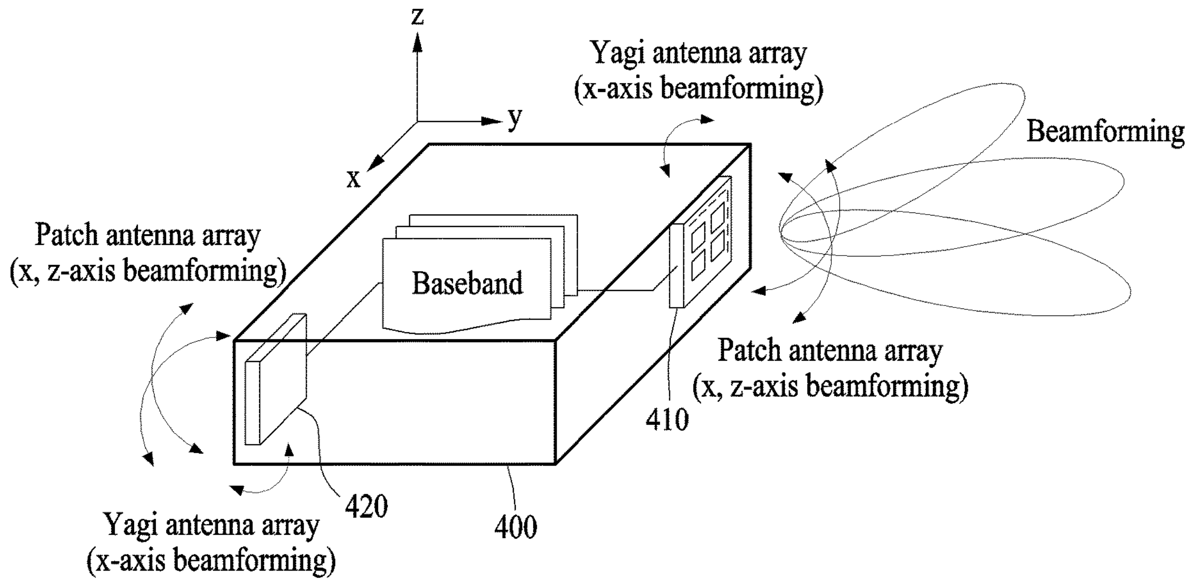

Referring to FIG. 4, an electronic device 400 may include a plurality of antenna packages 410 and 420. A first antenna package 410 may include patch antenna arrays that cover a front surface of the electronic device 400 and Yagi antenna arrays that cover top and left surfaces of the electronic device 400. The patch antenna arrays may be represented as a quadrilateral disposed on x and z-axis planes, and the Yagi antenna arrays may be represented by line segments disposed in an x-axis direction and line segments disposed in a z-axis direction in the first antenna package 410. A second antenna package 420 may include patch antenna arrays that cover a rear surface of the electronic device 400 and Yagi antenna arrays that cover bottom and right surfaces of the electronic device 400.

Figure 5:
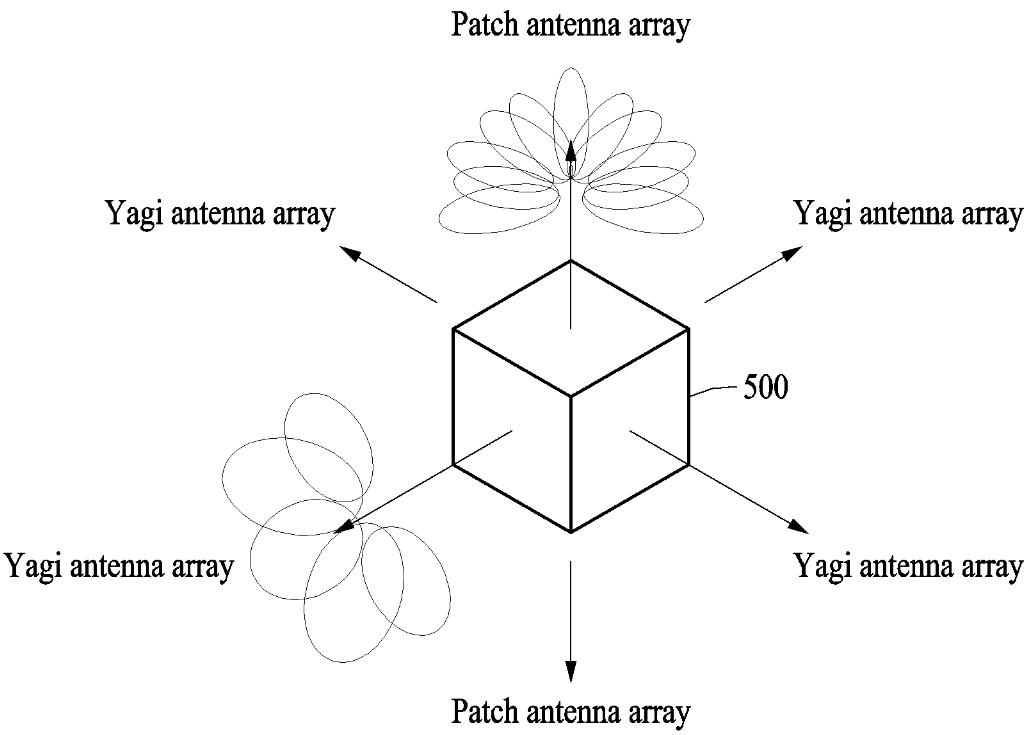

Referring to FIG. 5, an example of a plurality of sectors based on an electronic device 500 is illustrated. The electronic device 500 may implement an omnidirectional coverage (e.g., 360-degree)(° connection coverage) through patch antenna arrays and Yagi antenna arrays. In the example illustrated in FIG. 5, two patch antenna arrays and four Yagi antenna arrays may each cover one side of the electronic device 500. For example, one of the two patch antenna arrays may cover the upper surface, the other patch antenna array may cover the lower surface, and the four Yagi antenna arrays may cover the front, the rear, the right, and the left surface, respectively. Each side of the electronic device 500 may correspond to one sector.

To be described hereinafter, beam switching may be an operation in which a beam for performing communication is changed from one side (i.e., one sector) to another side (i.e., another sector), and beamforming may be an operation in which a beam for performing communication is changed in the same side (i.e., the same sector). For example, when the beam is changed from the front side to the top side, the electronic device 500 may identify an optimal beam through beam switching. When the beam is changed from the front side, the electronic device 500 may perform beamforming to identify the optimal beam.

When the beamforming is performed on the patch antenna arrays, the patch antenna arrays may include 11 levels, but are not limited thereto, and when the beamforming is performed on the Yagi antenna arrays, the Yagi antenna arrays may include five levels, but are not limited thereto.

Figure 6:
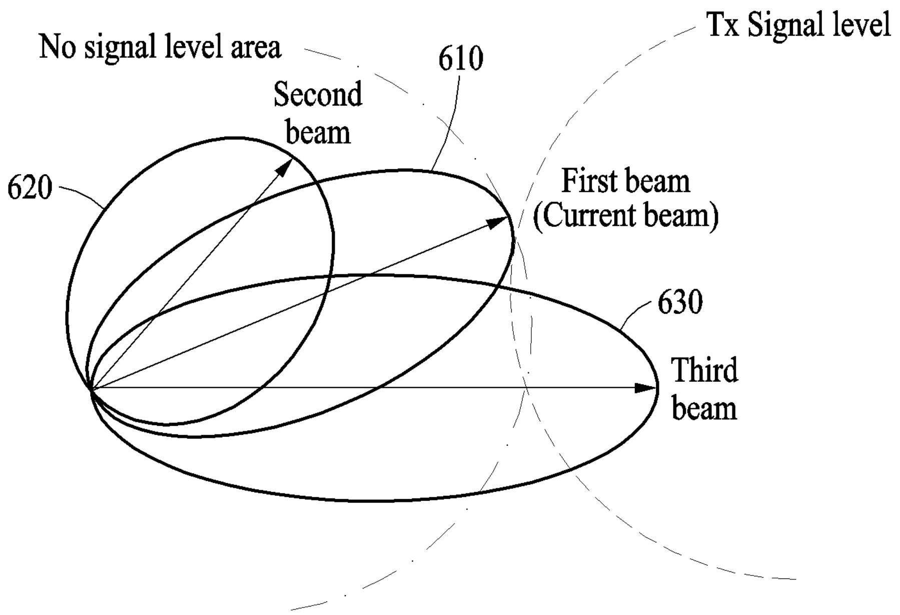
FIG. 6 illustrates an example of a beam switching operation.

FIG. 6 illustrates an example of an operation of a beam switching operation.

Referring to FIG. 6, a first beam 610 may represent a beam currently used by an electronic device to perform communication and may belong to a first sector. A second beam 620 may belong to a second sector, and a third beam 630 may belong to a third sector. That is, the first beam 610, the second beam 620, and the third beam 630 may represent beams belonging to different sectors. When a signal quality of the first beam 610 decreases below a preset threshold, the electronic device may perform a beam switching operation in a direction of another sector.

For example, the electronic device may transmit large capacity data through a high-speed channel and transmit a beam switching command through a low-speed channel to prevent a loss of the large capacity data in a beam switching process, but when the beam switching operation is performed without data loss, both the large capacity data and the beam switching command may be transmitted through a single channel without having to provide both the high-speed channel and the low-speed channel. Both an uplink and a downlink may be implemented with the single channel.

When the electronic device operates as a receiver, and a signal of a beam received from the transmitter is weakened, the beam may be switched to a different direction. After the signal of the beam is weakened, a beam switching operation time may include a time tr1 for determining that the signal is weakened and a time tr2 for switching to a different beam. Signal loss may occur during the time tr2 consumed for switching to another beam.

When the electronic device operates as a transmitter and receives information associated with the signal of the beam being weakened from the receiver, an operation of switching the beam in the direction of the beam to a different direction and an operation of transmitting an acknowledgement signal indicating that the beam has changed using the receiver after the switching may be performed. After the signal of the beam is weakened, the beam switching operation time may include a time tt1 when the receiver determines that the signal is weakened, a time tt2 when the receiver transmits information that the signal of the beam is weakened to the transmitter, a time tt3 when the transmitter switches to another beam, and a time tt4 when the transmitter transmits the acknowledgement signal to the receiver. Signal loss may occur during the time tt3 consumed when the transmitter switches to another beam.

While there may be some differences in the operation of the transmitter and the operation of the receiver, signal loss may occur in a process of switching the current beam to a beam in a different direction for both the transmitter and the receiver. To prevent such signal loss, the electronic device may maintain the first (current) beam 610 in an on state and turn on a new beam (e.g., a second beam 620) in another sector. The electronic device may determine whether a signal quality of the second beam 620 is greater than a signal quality of the first beam 610 and turn off either the first beam 610 and the second beam 620. In an example, the signal quality of the second beam 620 may be poorer than the signal quality of the first beam 610 because the second beam 620 is unable to reach the transmission signal level at all. The electronic device may maintain the first beam 610 in the on state, turn off the second beam 620, and turn on a third beam 630 in another sector. In this example, a signal quality of the third beam 630 may be determined to be greater than the signal quality of the first beam 610 because the third beam 630 reaches a more sufficient transmission signal level than the first current 610, and the first beam 610 may be turned off. The electronic device may determine whether a signal quality is greater or not by continuously maintaining the first beam 610 in the on state and turning on a new beam (e.g., a second beam, a third beam, etc.), and when the signal quality is greater, the new beam may be kept turned on, and the current beam may be turned off. In addition, when it is determined that the new beam does not have a greater signal quality, the electronic device may sequentially change the direction of the beam to a different direction and maintain the current beam in the on state until an optimal beam is found. Such a beam switching operation may prevent signal loss from occurring.

Power consumption may double in the beam switching operation because both the current beam and the new beam are turned on. As the transmitter consumes more power than the receiver, it may be more desirable for the beam switching operation to be performed by the receiver. That is, when a receiver that consumes a small amount of power identifies the optimal beam by performing the beam switching operation, the transmitter does not need to perform a separate beam switching operation. By performing a beam switching operation in an AR CE instead of AR glasses operating on a battery power, low-power operation may be realized by reducing power consumption of the entire system.

Figure 7:
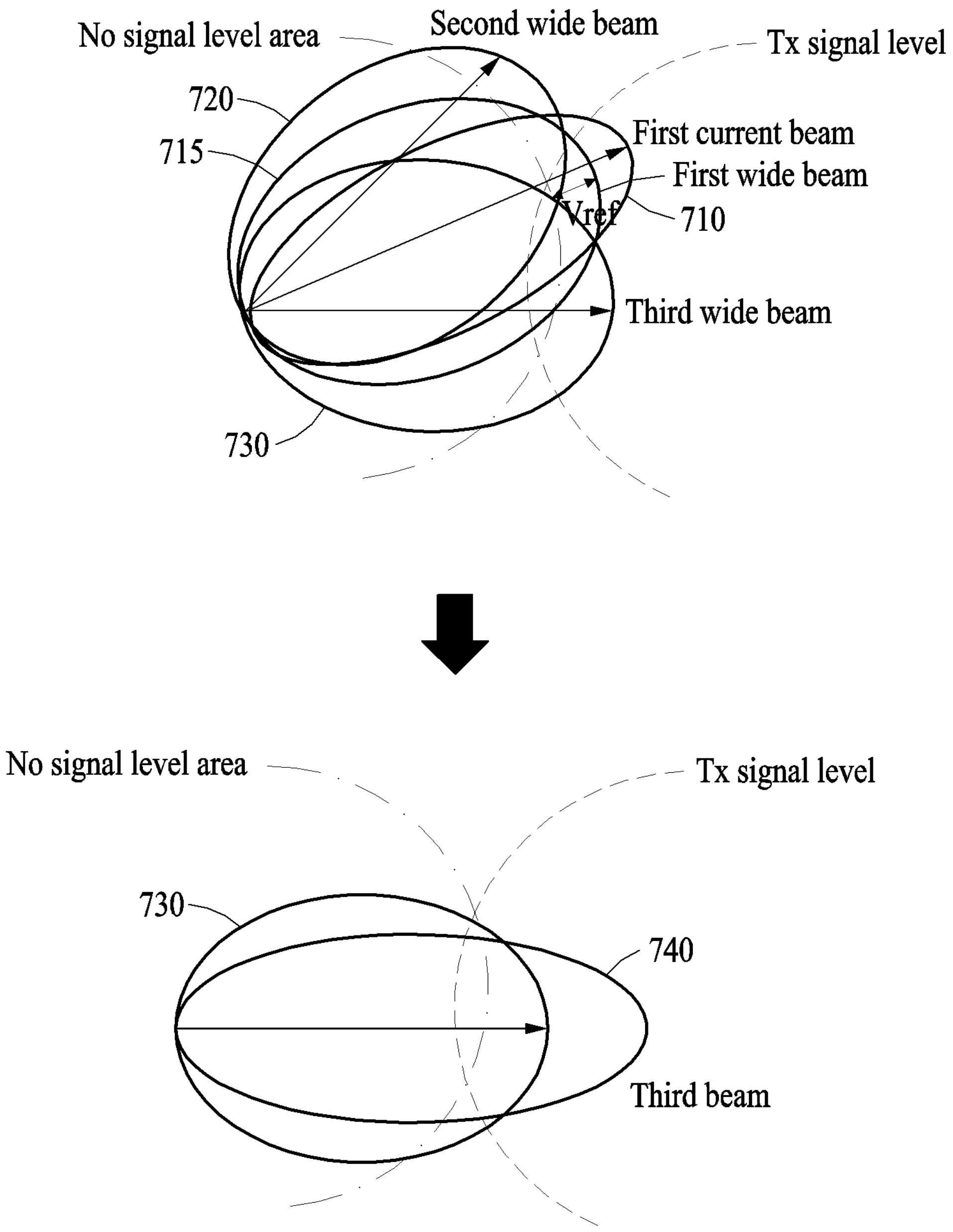
FIG. 7 illustrates an example of a beamforming operation.

FIG. 7 illustrates an example of a beamforming operation.

Referring to FIG. 7, a first beam 710 may be a beam currently used by an electronic device to perform communication, and a second beam and a third beam may be beams having different directions in the same sector as the first beam 710. When a signal quality of the first beam 710 decreases below a preset threshold, the electronic device may perform a beamforming operation in a different direction in the same sector.

Beamforming may be performed through the same procedure as beam switching when a beam is being changed. However, beamforming may be based on an operation of changing a phase value of an antenna array in a sector to change a direction of a beam in the same sector. That is, beamforming may be changing a direction of a beam in the same sector to a better direction.

Unlike beam switching in which a beam is turned on and off, beamforming may change a direction of a beam in the same sector, and thus signal loss may occur when the direction of the beam is switched to a more degraded direction. In the example illustrated in FIG. 7, when the electronic device changes a direction of the first beam 710, which is the current beam, to the direction of a second beam, a width of the second beam may be narrow such that a transmission signal level is not reached, and thus signal loss may occur. To prevent such signal loss, the electronic device may increase the width of the beam before switching the direction of the beam. The electronic device may form a wide beam by increasing the width of the beam, and since the beam is wider, the beam may be widened even when the direction of the wide beam is switched to a degraded direction, thereby preventing a signal loss.

The electronic device may increase the width of the first beam 710, which is the current beam, to form a first wide beam 715. When the width of the first beam 710 is increased, a beam level of the first wide beam 715 may decrease. The electronic device may use a smaller number of antenna arrays to form the first wide beam 715 than to form the first beam 710 to reduce power consumption (e.g., one half of the antenna arrays used to form the first beam 710). The electronic device may adjust a direction of the first wide beam 715. For example, when the electronic device changes the direction of the first wide beam 715 to the direction of a second wide beam 720, a signal loss may be prevented because the second wide beam 720 may still reach the transmission signal level. However, since a size of an area reaching the transmission signal level in the second wide beam 720 is smaller than that of the first wide beam 715, the signal quality may be weakened. When the electronic device changes the direction of the first wide beam 715 to the direction of a third wide beam 730, a size of an area reaching a transmission signal level in the third wide beam 730 may be greater than that of the first wide beam 715, and thus the signal quality may be greater. Thus, even when the first wide beam 715 is switched to the second wide beam 720 or the third wide beam 730, the transmission signal level may be reached due to the width of the wide beam, allowing the optimal beam direction to be identified without a signal loss. The electronic device may reduce a width of the third wide beam 730 determined to be in a direction in which a signal loss is reduced to an original width of the first beam 710 that was widened to form the first wide beam 715 and complete the beamforming operation with a third beam 740 having the reduced width.

When the beam width increases in the beamforming operation, a beam level may decrease, and thus when the beamforming operation is performed while the current beam barely reaches the transmission signal level, the signal quality may be weakened. Thus, the beamforming operation may begin when a level of the current beam is lowered below a preset threshold (e.g., $V_{ref}$) or a bit error rate (BER) of the current beam is lowered below a preset threshold, or when a difference between the level of the current beam and a no signal level area is lower than a preset threshold.

As the number of antenna arrays used to widen a beam width is reduced, power consumption may also be reduced in the beamforming operation. Since the transmitter consumes more power than the receiver, the transmitter may preferentially perform the beamforming operation instead of the receiver. That is, when the transmitter that consumes a great amount of power identifies an optimal beam by performing the beamforming operation, the receiver may not need to perform a separate beamforming operation. In addition, AR glasses operating on battery power may preferentially perform the beamforming operation over an AR CE, and thus low-power operation for the entire system may be realized.

While power consumption for the beam switching operation illustrated in FIG. 6 is doubled, power consumption for the beamforming operation illustrated in FIG. 7 may be reduced. Thus, a low-power operation may be implemented for the entire system by performing the beamforming operation preferentially over the beam switching operation. That is, when an optimal beam is identified through the beamforming operation, the beam switching operation that consumes a great amount of power need not be performed.

Figure 8:
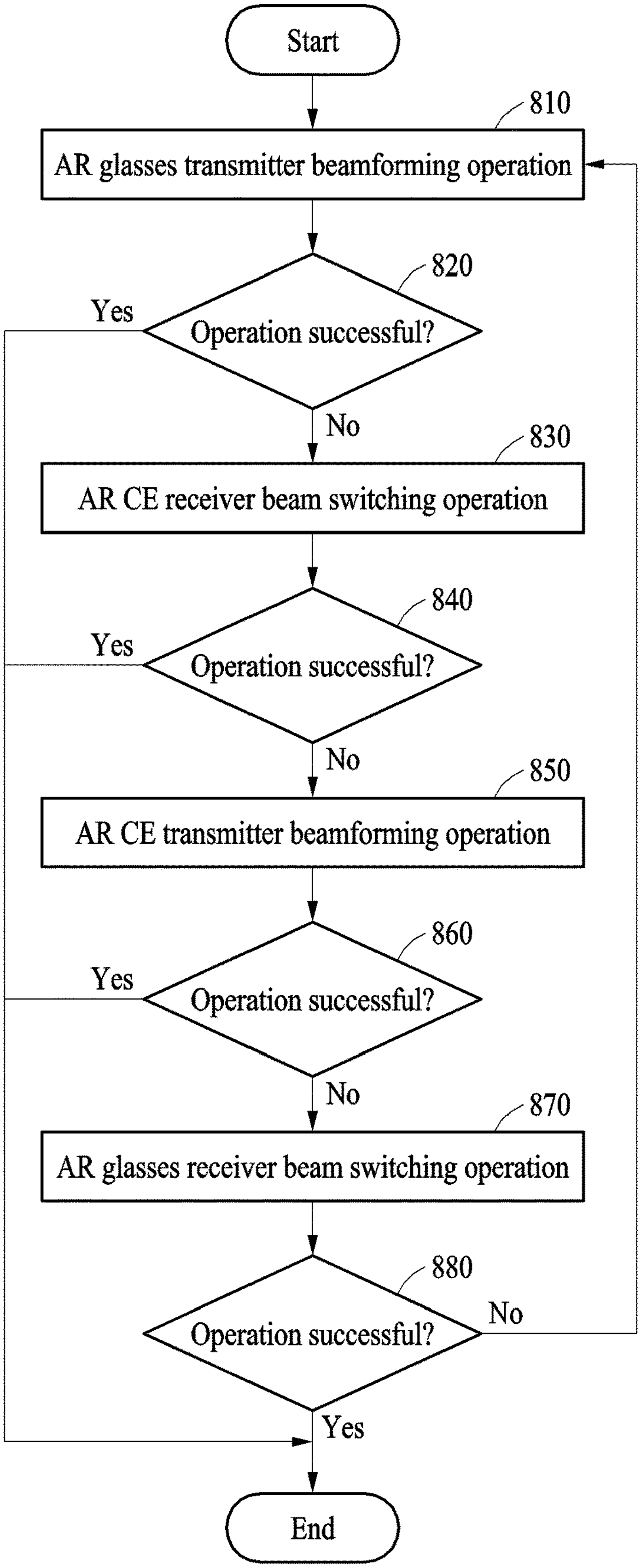
FIGS. 8 and 9 illustrate examples of a beam switching and beamforming operation.
Figure 9:
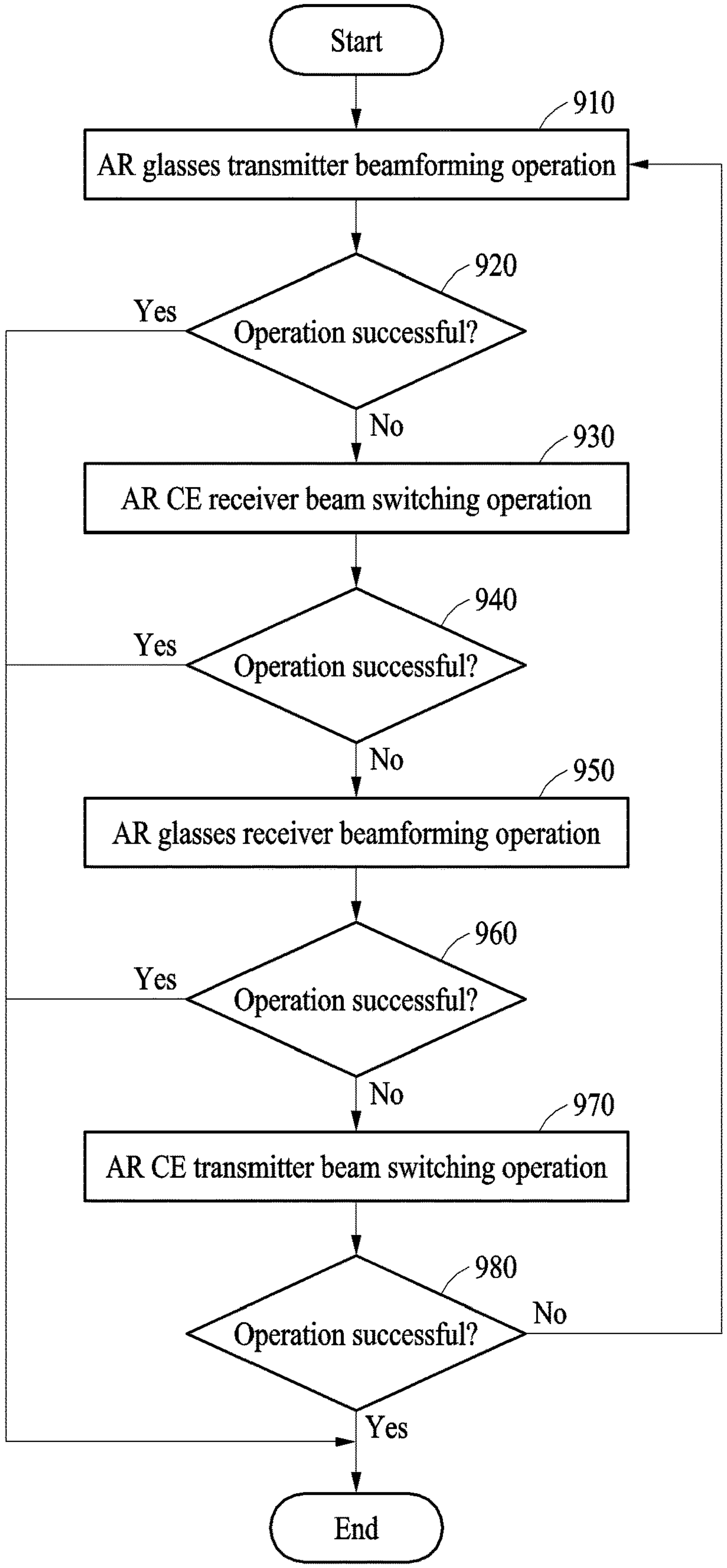

FIGS. 8 and 9 illustrate examples of a beam switching and beamforming operation.

Referring to FIG. 8, an example of a beam switching and beamforming operation for minimizing power consumption for an entire system including AR glasses and an AR CE is illustrated.

In operation 810, the AR glasses may operate as a transmitter and perform a beamforming operation. The AR glasses may be a device operating on battery power and reduce power consumption through the beamforming operation.

In operation 820, the beamforming operation of the AR glasses may determine whether a beam is optimal. For example, when a level of the beam changed by the beamforming operation is higher than a preset threshold (e.g., $V_{ref}$+3 dB) or the BER of the changed beam is higher than a preset threshold, the beam may be identified as an optimal beam. When the optimal beam is identified, the beam switching and beamforming operation may be terminated. In contrast, when the optimal beam is not identified through the beamforming operation of the AR glasses, operation 830 may be performed.

In operation 830, the AR CE may operate as a receiver and perform a beam switching operation.

In operation 840, the beam switching operation of the AR CE may determine whether a beam is optimal, and when a beam is identified as an optimal beam, the beam switching and beamforming operation may be terminated. In contrast, when an optimal beam is not identified by the beam switching operation of the AR CE, operation 850 may be performed.

In operation 850, the AR CE may operate as a transmitter and perform the beamforming operation.

In operation 860, the beamforming operation of the AR CE may determine whether a beam is optimal, and when a beam is identified as an optimal beam, the beam switching and beamforming operation may be terminated. In contrast, when an optimal beam is not identified by the beamforming operation of the AR CE, operation 870 may be performed.

In operation 870, the AR glasses may operate as a receiver and perform the beam switching operation.

In operation 880, the beam switching operation of the AR glasses may determine whether a beam is optimal, and when a beam is identified as an optimal beam, the beam switching and beamforming operation may be terminated. In contrast, when the optimal beam is not identified through the beam switching operation of the AR glasses, operation 810 may be repeated.

Referring to FIG. 9, an example of a beam switching and beamforming operation for preferentially minimizing power consumption of AR glasses operating on battery power is illustrated. To preferentially minimize power consumption of the AR glasses, operations 850 and 870 illustrated in FIG. 8 may be changed to operations 950 and 970, respectively, which are described below. In operation 950, the AR glasses may operate as a receiver and perform a beamforming operation. In operation 970, the AR CE may operate as a transmitter and perform a beam switching operation. Descriptions of other operations 910 through 940, 960, and 980 are the same as the descriptions of operations 810 to 840, 860, and 880 provided with reference to FIG. 8. Thus, a more detailed description of the other operations 910 through 940, 960, and 980 is not included here for brevity.

Referring to FIGS. 8 and 9, an order of operations is determined considering the factors that the transmitter consumes more power than the receiver, the patch antenna array beamforming has 11 levels, the Yagi antenna array beamforming has 5 levels, power consumption is double for beam switching, and power consumption is one half for beamforming, but the factors are not limited thereto.

Figure 10:
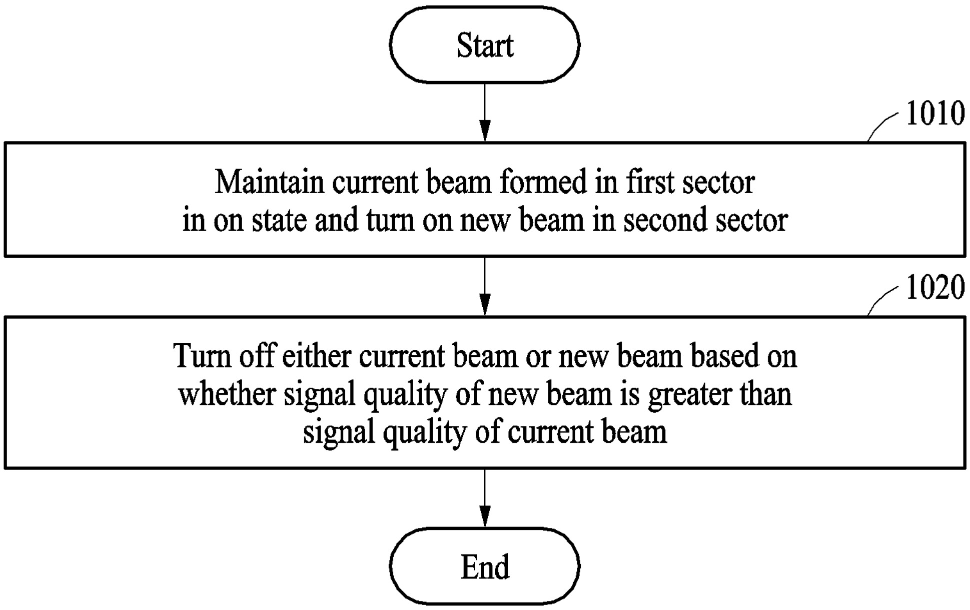
FIGS. 10 and 11 illustrate examples of a method of operating an electronic device.
Figure 11:
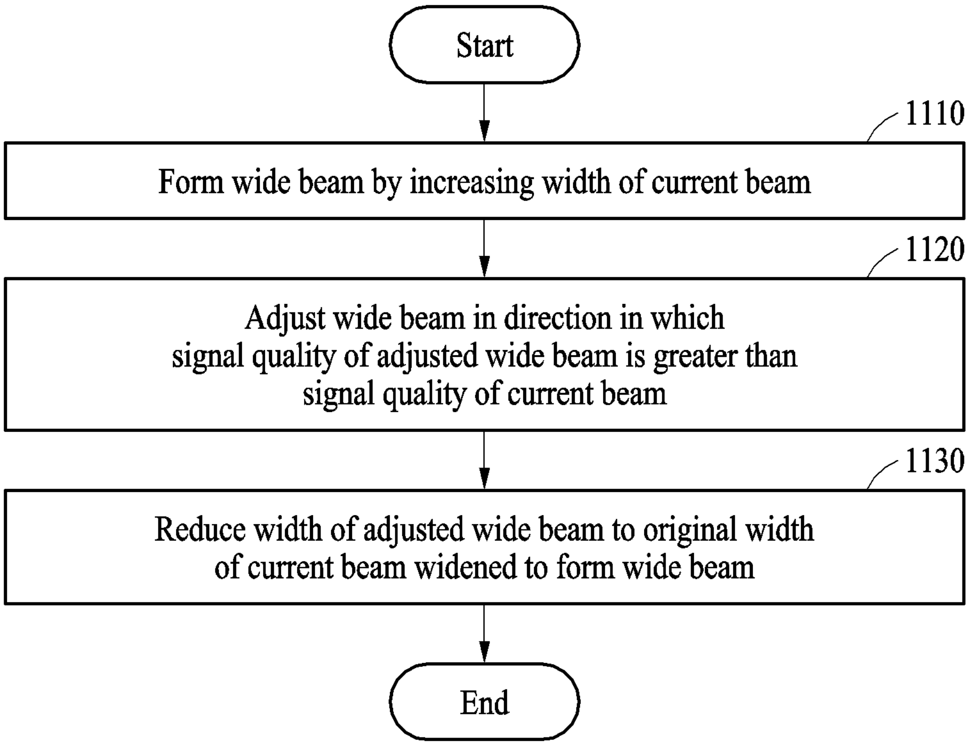

FIGS. 10 and 11 illustrate examples of a method of operating an electronic device.

Referring to FIG. 10, an example of a method of operating an electronic device for performing beam switching is illustrated. In the following examples, operations may be performed sequentially, but are not necessarily performed sequentially. For example, the operations may be performed in different orders, and at least two of the operations may be performed in parallel. Operations 1010 and 1020 may be performed by at least one component (e.g., a controller, a processor, etc.) of the electronic device.

In operation 1010, the electronic device may maintain a current beam formed in a first sector by one or more antenna arrays in an on state and turn on a new beam in a second sector that is different from the first sector. The first sector and the second sector may correspond to different surfaces of the electronic device.

In operation 1020, the electronic device may turn off either the current beam or the new beam based on whether a signal quality of the new beam is greater than a signal quality of the current beam. For example, the electronic device may turn off the current beam and perform communication through the new beam in response to the signal quality of the new beam being greater than the signal quality of the current beam. The electronic device may turn off the new beam, turn on the second new beam in a third sector that is different from the second sector, and turn off either the current beam or the second new beam based on whether the signal quality of the second new beam is greater than the signal quality of the current beam in response to the signal quality of the new beam not being greater than the signal quality of the current beam.

In addition, the electronic device may form a wide beam by increasing a width of the current beam by the one or more antenna arrays, adjust the wide beam in a direction in which the signal quality of the wide beam is greater, and reduce a width of the adjusted wide beam to an original width of the current beam that was widened to form the wide beam.

When the electronic device operates as a receiver instead of a transmitter, the electronic device may maintain a second current beam in an on state, turn on a third new beam, and turn off either the second current beam or the third new beam based on whether a signal quality of the second current beam is greater than a signal quality of the third new beam.

To be described in detail hereinafter, a second sector among a plurality of sectors that are different from the first sector may be selected based on a motion of the electronic device estimated from an image captured by a camera and/or a motion of the electronic device measured by an IMU.

The descriptions provided with reference to FIGS. 1 through 9 are also applicable to the operations illustrated in FIG. 10. Thus, a more detailed description of the operations illustrated in FIG. 10 is not included here for brevity.

Referring to FIG. 11, a method of operating an electronic device for performing beamforming is illustrated. In the following examples, operations may be performed sequentially, but are not necessarily performed sequentially. For example, the operations may be performed in different orders, and at least two of the operations may be performed in parallel. Operations 1110, 1120, and 1130 may be performed by at least one component (e.g., a controller, a processor, etc.) of the electronic device.

In operation 1110, the electronic device may increase a width of a current beam by one or more antenna arrays to form a wide beam.

In operation 1120, the electronic device may adjust the wide beam in a direction in which a signal quality of the wide beam is greater. The electronic device may adjust the wide beam in the direction in which the signal quality of the wide beam is greater in the same sector that the current beam is in.

In operation 1130, the electronic device may reduce a width of the adjusted wide beam to an original width of the current beam that was widened to form the wide beam.

When the electronic device operates as a transmitter, the electronic device may increase a width of a third current beam when the electronic device operates as a receiver, adjust a second wide beam in a direction in which the signal quality of the second wide beam is greater, and reduce a width of the adjusted second wide beam to an original width of the third current beam that was widened to form the second wide beam.

In addition, the electronic device may maintain a current beam formed in a first sector by one or more antenna arrays in an on state, turn on a new beam in a second sector that is different from the first sector, and turn off either the current beam or the new beam based on whether a signal quality of the new beam is greater than the signal quality of the current beam.

The descriptions provided with reference to FIGS. 1 through 9 are applicable to the operations illustrated in FIG. 11. Thus, a more detailed description of the operations illustrated in FIG. 11 is not included here for brevity.

Figure 12:
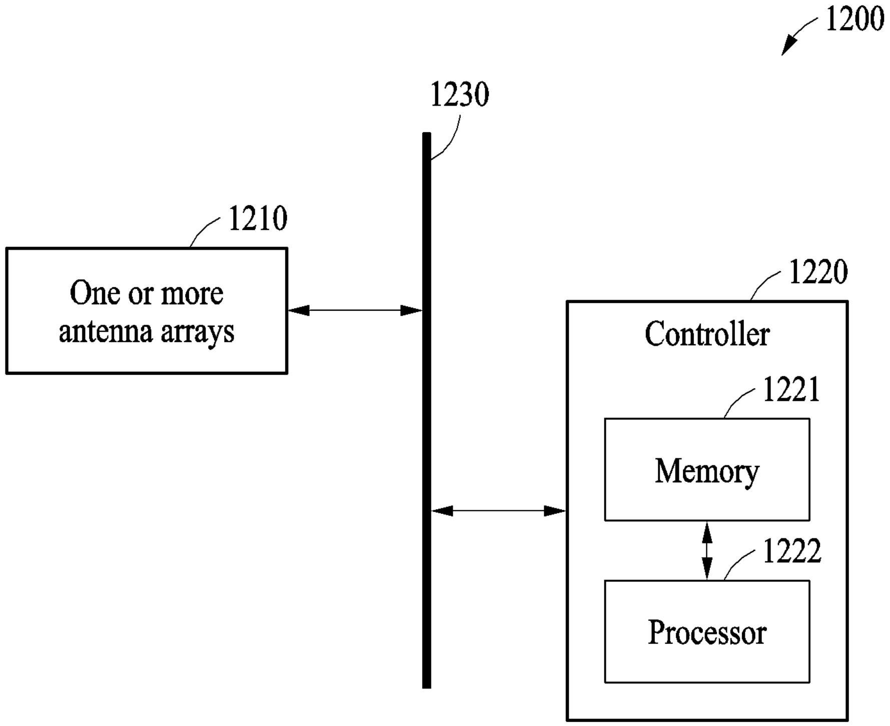
FIG. 12 illustrates an example of an electronic device.

FIG. 12 illustrates an example of an electronic device.

Referring to FIG. 12, an electronic device 1200 may include one or more antenna arrays 1210 and a controller 1220. The one or more antenna arrays 1210 and the controller 1220 may communicate with each other through a device 1230 such as a bus, a Peripheral Component Interconnect Express (PCIe), a network on a chip (NoC), or other device capable of enabling the one or more antenna arrays 1210 and the controller 1220 to communicate with each other.

The one or more antenna arrays 1210 may include patch antenna arrays and/or Yagi antenna arrays.

The controller 1220 may include a memory 1221 and a processor 1222. The memory 1221 may store computer-readable instructions. The processor 1222 may perform the operations performed by the controller 1220 as described in this application when the instructions stored in the memory 1221 are executed by the processor 1222. The memory 1221 may be a volatile memory or a non-volatile memory.

When a beam switching operation is performed, the controller 1220 may maintain a current beam formed in a first sector by the one or more antenna arrays 1210 in an on state, turn on a new beam in a second sector that is different from the first sector, and turn off either the current beam or the new beam based on whether a signal quality of the new beam is greater than a signal quality of the current beam. In addition, when a beamforming operation is performed, the controller 1220 may increase a width of the current beam by the one or more antenna arrays 1210 to form a wide beam, increase the signal quality of the wide beam by adjusting the wide beam in a direction in which the signal is greater, and reduce the width of the adjusted wide beam to an original width of the current beam that was widened to form the wide beam.

In an example, the electronic device 1200 may further include one or more of a memory, a processor, and a transceiver. The memory may store computer-readable instructions. The processor may perform the operations described above when the instructions stored in the memory are executed by the processor. The memory may be a volatile memory or a non-volatile memory. For example, the processor may sense a signal quality, determine beam switching and/or beamforming based on a result of the sensing, and perform an operation based on a result of the determining. The controller 1220 may perform an operation based on the determined result among operations.

In another example, the electronic device 1200 may further include a camera (not shown) capturing an image of the front and/or surroundings of the electronic device 1200 and/or an IMU (not shown) measuring a movement of the electronic device 1200. The electronic device 1200 may perform the beam switching and/or the beamforming operation using a movement of the electronic device 1200 estimated from the image captured by the camera and/or the movement measured by the IMU. An optimal propagation environment and an optimal communication environment may be effectively achieved by performing the beam switching and/or the beamforming operation based on the movement of the electronic device 1200 occurring as a result of a control of a user.

In addition, the electronic device 1200 may determine a target device (e.g., AR glasses or AR CE) to perform the beam switching and/or the beamforming operations based on a communication channel environment, and the target device may select whether to perform beam switching or beamforming. In addition to the electronic device 1200 performing beam switching and/or beamforming operations based on the communication channel environment, the electronic device 1200 may additionally adjust an audiovisual (AV) resolution or a physical layer (PHY) (e.g., modulation degree, bandwidth, coding rate) to maintain an optimal channel environment.

The electronic device 1200 may perform wireless communication through a beam formed by the one or more antenna arrays 11210 and may be, for example, any of various computing devices such as a mobile phone, a smartphone, a tablet PC, a laptop, a personal computer (PC), or an e-book device, various wearable devices such as a smartwatch, smart eyeglasses, a head-mounted display (HMD), or smart clothes, various home appliances such as a smart speaker, a smart television (TV), and a smart refrigerator, and other devices such as a smart vehicle, a smart kiosk, an Internet of Things (IoT) device, a walking assist device (WAD), a drone, and a robot. For example, the electronic device 1200 may be a device performing communication based on low-speed channels such as a long-term evolution (LTE) device or a third generation (3G) device as well as high-speed channels such as a fifth generation (5G) millimeter wave and process the operations described above.

The divider 210 and the processor 230 in FIG. 2, the processor 330 and the combiner 340 in FIG. 3, and the controller 1220 in FIG. 12 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 6-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device comprising:

one or more antenna arrays; and a controller configured to control the one or more antenna arrays, wherein the electronic device is configured to operate as a receiver, and the controller is configured to:

maintain a current beam formed in a first sector by the one or more antenna arrays in an on state;

turn on a new beam in a second sector that is different from the first sector; and turn off either the current beam or the new beam based on a determination of whether a signal quality of the new beam is greater than a signal quality of the current beam, wherein the current beam and the new beam, which are formed in different sectors, are both maintained in the on state during the determination, wherein, in response to the new beam being not greater than the signal quality of the current beam, the controller is further configured to sequentially change the new beam to a different direction while maintaining the current beam in the on state until an optimal beam is found, wherein the controller is further configured to:

form a wide beam by increasing a width of the current beam by the one or more antenna arrays;

adjust the wide beam in a direction in which a signal quality of the adjusted wide beam is greater than the signal quality of the current beam; and reduce a width of the adjusted wide beam to an original width of the current beam that was widened to form the wide beam, and wherein the controller is further configured to:

maintain the current beam formed in the first sector in the on state in response to there being no direction in which the signal quality of the adjusted wide beam is greater than the signal quality of the current beam;

turn on another new beam in the second sector; and turn off either the current beam or the other new beam based on whether a signal quality of the new beam is greater than the signal quality of the current beam.

2. The electronic device of claim 1, wherein the controller is further configured to:

turn off the current beam in response to the signal quality of the new beam being greater than the signal quality of the current beam; and perform communication through the new beam.

3. The electronic device of claim 1, wherein the controller is further configured to:

turn off the new beam in response to the signal quality of the new beam not being greater than the signal quality of the current beam;

turn on a second new beam in a third sector that is different from the second sector; and turn off either the current beam or the second new beam based on whether a signal quality of the second new beam is greater than the signal quality of the current beam.

4. The electronic device of claim 1, wherein the electronic device is a fixed electronic device, and the controller is further configured to operate the fixed electronic device as a receiver, maintain the current beam formed in the first sector in the on state, turn on the new beam in the second sector, and turn off either the current beam or the new beam based on whether the signal quality of the new beam is greater than the signal quality of the current beam in response to it being impossible to adjust another wide beam in a direction in which a signal quality of the adjusted other wide beam is greater than a signal quality of another current beam in a mobile electronic device operating as a transmitter.

5. The electronic device of claim 1, wherein the controller is further configured to:

maintain the current beam formed in the first sector in the on state, turn on the new beam in the second sector, and turn off either the current beam or the new beam in response to the electronic device operating as the receiver;

operate the electronic device as a transmitter in response to the signal quality of the new beam not being greater than the signal quality of the current beam;

maintain a second current beam formed in the first sector by the one or more antenna arrays;

turn on a third new beam in the second sector; and turn off either the second current beam or the third new beam based on whether the signal quality of the third new beam is greater than the signal quality of the second current beam.

6. The electronic device of claim 1, wherein the first sector and the second sector correspond to different sides of the electronic device.

7. The electronic device of claim 1, further comprising either one or both of:

a camera configured to capture an image of a front of the electronic device and/or surroundings of the electronic device; and an inertial measurement unit (IMU) configured to measure a movement of the electronic device, wherein the controller is further configured to select the second sector from a plurality of sectors that are different from the first sector based on a movement of the electronic device estimated from the image captured by the camera and/or the movement of the electronic device measured by the IMU.

8. An electronic device comprising:

one or more antenna arrays; and a controller configured to control the one or more antenna arrays, wherein the controller is configured to:

form a wide beam by increasing a width of a current beam by the one or more antenna arrays;

adjust the wide beam in a direction in which a signal quality of the adjusted wide beam is greater than a signal quality of the current beam;

reduce a width of the adjusted wide beam to an original width of the current beam that was widened to form the wide beam;

operate the electronic device as a transmitter or receiver;

form the wide beam, adjust the wide beam, and reduce the width of the adjusted wide beam in response to the electronic device operating as the transmitter; and operate the electronic device as the receiver in response to a determination that the wide beam cannot be adjusted in a direction in which the signal quality of the adjusted wide beam is greater than the signal quality of the current beam.

9. The electronic device of claim 8, wherein the controller is further configured to adjust the wide beam in a direction in which the signal quality of the adjusted wide beam is greater than the signal quality of the current beam in a same sector as the current beam.

10. The electronic device of claim 8, wherein the controller is further configured to:

form a second wide beam by increasing a width of a third current beam by the one or more antenna arrays;

adjust the second wide beam in a direction in which the signal quality of the adjusted second wide beam is greater than a signal quality of the third current beam; and reduce a width of the adjusted second wide beam to an original width of the third current beam that was widened to form the second wide beam.

11. The electronic device of claim 8, wherein the current beam is formed in a first sector by the one or more antenna arrays, and the controller is further configured to:

maintain the current beam formed in the first sector in an on state;

turn on a new beam in a second sector that is different from the first sector; and turn off either the current beam or the new beam based on whether a signal quality of the new beam is greater than the signal quality of the current beam.

12. The electronic device of claim 11, wherein the controller is further configured to maintain the current beam formed in the first sector in the on state, turn on the new beam in the second sector, and turn off either the current beam or the new beam based on whether the signal quality of the new beam is greater than the signal quality of the current beam in response to there being no direction in which the signal quality of the adjusted wide beam is greater than the signal quality of the current beam.

13. The electronic device of claim 8, further comprising:

a camera configured to capture an image of a front of the electronic device and/or surroundings of the electronic device; and an inertial measurement unit (IMU) configured to measure a movement of the electronic device, and the controller is further configured to determine a direction in which the signal quality of the adjusted wide beam is greater than the signal quality of the current beam based on a movement of the electronic device estimated from the image captured by the camera and/or the movement of the electronic device measured by the IMU.

14. A method of operating an electronic device comprising one or more antenna arrays, the method comprising:

operating the electronic device as a receiver;

maintaining a current beam formed in a first sector by the one or more antenna arrays in an on state;

turning on a new beam in a second sector that is different from the first sector;

turning off either the current beam or the new beam based on a determination of whether a signal quality of the new beam is greater than a signal quality of the current beam; and in response to the new beam being not greater than the signal quality of the current beam, sequentially changing the new beam to a different direction while maintaining the current beam in the on state until an optimal beam is found, wherein the current beam and the new beam, which are formed in different sectors, are both maintained in the on state during the determination, wherein the method further comprises:

forming a wide beam by increasing a width of the current beam by the one or more antenna arrays;

adjusting the wide beam in a direction in which a signal quality of the adjusted wide beam is greater than the signal quality of the current beam; and reducing a width of the adjusted wide beam to an original width of the current beam that was widened to form the wide beam, and wherein the method further comprises:

maintaining the current beam formed in the first sector in the on state in response to there being no direction in which the signal quality of the adjusted wide beam is greater than the signal quality of the current beam;

turning on another new beam in the second sector; and turning off either the current beam or the other new beam based on whether a signal quality of the new beam is greater than the signal quality of the current beam.

15. The method of claim 14, wherein the turning off of either the current beam or the new beam comprises turning off the current beam in response to the signal quality of the new beam being greater than the signal quality of the current beam, and the method further comprises performing communication through the new beam.

16. The method of claim 14, wherein the turning off of either the current beam or the new beam comprises turning off the new beam in response to the signal quality of the new beam not being greater than the signal quality of the current beam, and the method further comprises:

turning on a second new beam in a third sector that is different from the second sector, and turning off either the current beam or the second new beam based on whether a signal quality of the second new beam is greater than the signal quality of the current beam.

17. A non-transitory computer-readable storage medium storing instructions that, when executed by a processor, cause the processor to perform the method of claim 14.

* * * * *